US011989835B2

(12) United States Patent
Amacker et al.

(10) Patent No.: US 11,989,835 B2
(45) Date of Patent: May 21, 2024

(54) AUGMENTED REALITY OVERLAY (71) Applicant: Toyota Research Institute, Inc., Los Altos, CA (US)

(72) Inventors: Matthew Amacker, Santa Clara, CA (US); Arshan Poursohi, Berkley, CA (US); Allison Thackston, San Jose, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 433 days.

(21) Appl. No.: 16/038,248

(22) Filed: Jul. 18, 2018

(65) Prior Publication Data

US 2019/0096134 A1    Mar. 28, 2019

Related U.S. Application Data (60) Provisional application No. 62/563,366, filed on Sep. 26, 2017.

(51) Int. Cl.
*G06T 19/00* (2011.01)
*B25J 9/16* (2006.01)
*G05D 1/00* (2006.01)
*G06F 3/04815* (2022.01)
*G06V 20/10* (2022.01)
(Continued)

(52) U.S. Cl.
CPC ........... *G06T 19/006* (2013.01); *B25J 9/1697* (2013.01); *G05D 1/0038* (2013.01); *G06F 3/04815* (2013.01); *G06V 20/10* (2022.01); *G06V 20/20* (2022.01); *G06V 20/64* (2022.01); *G06V 2201/12* (2022.01)

(58) Field of Classification Search
CPC .. B25J 9/1697; G05D 1/0038; G06F 3/04815; G06K 9/00671; G06T 19/006
See application file for complete search history.

(56) References Cited

U.S. PATENT DOCUMENTS 6,144,375 A * 11/2000 Jain ...................... G11B 27/105
715/251
8,396,597 B2    3/2013 Anderson
(Continued)

FOREIGN PATENT DOCUMENTS

CN    106500700 A * 3/2017 ............. G01C 21/20

OTHER PUBLICATIONS

Machine translated, CN-106500700-A, filed on Nov. 15, 2016 and published on Mar. 15, 2017 (Year: 2016).*
(Continued)

*Primary Examiner* — Sing-Wai Wu
(74) *Attorney, Agent, or Firm* — Dinsmore & Shohl LLP (57) ABSTRACT

A computing device configured to display a virtual representation of an environment of a robot includes a display device, a memory, and a processor coupled to the memory. The processor is configured to receive data from the one or more sensors of the robot with respect to an object within an environment of the robot. The processor is also configured to display a virtual representation of the object within a virtual mapping of the environment based on the data received from the one or more sensors. The processor is further configured to receive input data selecting the virtual representation of the object. The processor is also further configured to send instructions to the robot to act in response to the received input data.

21 Claims, 7 Drawing Sheets

(51) Int. Cl.
*G06V 20/20* (2022.01)
*G06V 20/64* (2022.01)

(56) References Cited

U.S. PATENT DOCUMENTS

| | | | |
|---|---|---|---|
| 8,755,936 B2 | 6/2014 | Friedman et al. | |
| 9,265,187 B2 | 2/2016 | Cavender-Bares et al. | |
| 9,283,674 B2 | 3/2016 | Hoffman et al. | |
| 9,457,468 B1 | 10/2016 | Elazary et al. | |
| 9,540,171 B2 | 1/2017 | Elazary et al. | |
| 11,017,610 B2 * | 5/2021 | Nerurkar | G06F 3/038 |
| 2009/0015702 A1 * | 1/2009 | Garcia Alonso | H04N 5/23222 348/333.02 |
| 2014/0064607 A1 * | 3/2014 | Grossmann | G06T 3/0093 382/154 |
| 2014/0157156 A1 * | 6/2014 | Kawamoto | G05D 1/0038 715/764 |
| 2015/0069248 A1 * | 3/2015 | Alameh | G01J 1/0407 250/341.7 |
| 2015/0217449 A1 * | 8/2015 | Meier | B25J 9/1602 700/257 |
| 2015/0298315 A1 * | 10/2015 | Shick | G06N 3/008 700/246 |
| 2015/0341552 A1 * | 11/2015 | Chen | H04N 5/23238 348/38 |
| 2016/0019458 A1 * | 1/2016 | Kaufhold | G01S 7/417 342/25 F |
| 2017/0116781 A1 | 4/2017 | Babahajiani et al. | |
| 2017/0185085 A1 * | 6/2017 | Storfer | G05D 1/0214 |
| 2018/0080774 A1 * | 3/2018 | Sink | G06Q 10/10 |
| 2018/0130224 A1 * | 5/2018 | Hoelscher | G06T 19/00 |

OTHER PUBLICATIONS

A.M.Ramiyaa, Rama Rao Nidamanuria, R. Krishnan, Title: "Semantic Labelling of Urban Point Cloud Data", The International Archives of the Photogrammetry, Remote Sensing and Spatial Information Sciences, vol. XL-8, 2014 ISPRS Technical Commission VIII Symposium, Dec. 9-12, 2014, Hyderabad, India, URL: https://www.int-arch-photogramm-remote-sens-spatial-inf-sci.net/XL-8/907/2014/isprsarchives-XL-8-907-2014.pdf.

* cited by examiner

AUGMENTED REALITY OVERLAY

CROSS-REFERENCE TO RELATED APPLICATIONS

This application claims the benefit of U.S. Provisional Application No. 62/563,366, filed Sep. 26, 2017, which is incorporated by reference in its entirety.

TECHNICAL FIELD

The present specification generally relates to augmented reality and, more particularly, to presenting an augmented reality view to users based upon data gathered from autonomous or semi-autonomous robots.

BACKGROUND

Users of camera-enabled devices sometimes use the camera to observe their surroundings. Recently, augmented reality has provided users with onscreen information about objects that appear in the view of the camera. However, the available data about objects viewed in augmented reality is limited to data from a fixed database. This only provides the user with a static augmented reality view that is not dynamic.

Accordingly, a need exists for presenting an augmented reality to users utilizing data obtained by the perception of robots.

SUMMARY

A computing device configured to display a virtual representation of an environment of a robot includes a display device, a memory, and a processor coupled to the memory. The processor is configured to receive data from the one or more sensors of the robot with respect to an object within an environment of the robot. The processor is also configured to display a virtual representation of the object within a virtual mapping of the environment based on the data received from the one or more sensors. The processor is further configured to receive input data selecting the virtual representation of the object. The processor is also further configured to send instructions to the robot to act in response to the received input data.

In another embodiment, a system for object interaction in an environment of a robot includes the robot, a computing device, and a display device. The robot includes a plurality of sensors, where a first sensor is configured for visual detection and a second sensor is configured for spatial detection. The display device is configured to display a virtual representation of the object within a virtual mapping of the environment based on the data received from at least one of the plurality of sensors. The computing device is configured to receive data from the plurality of sensors of the robot with respect to an object within an environment of the robot. The computing device is also configured to display a virtual representation of the object within a virtual mapping of the environment based on the data received from the plurality of sensors. The computing device is further configured to receive input data selecting the virtual representation of the object. The computing device is also further configured to send instructions the robot to act in response to the received input data.

A method for object interaction in an environment of a robot includes receiving data from one of a plurality sensors of the robot with respect to an object within an environment of the robot. The method also includes outputting a virtual representation of the object within the virtual mapping of the environment based on the data received from the one or more sensors. The method further includes receiving input data selecting the virtual representation of the object. The method additionally includes outputting instructions to the robot to act in response to the received input data

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure are directed to an augmented reality overlay. The overlay may utilize data provided by robots that navigate an environment. More specifically, environment data may be provided by robots to a distributed network and displayed on a client device. Various embodiments of the augmented reality overlay are described in detail below.

Figure 1:
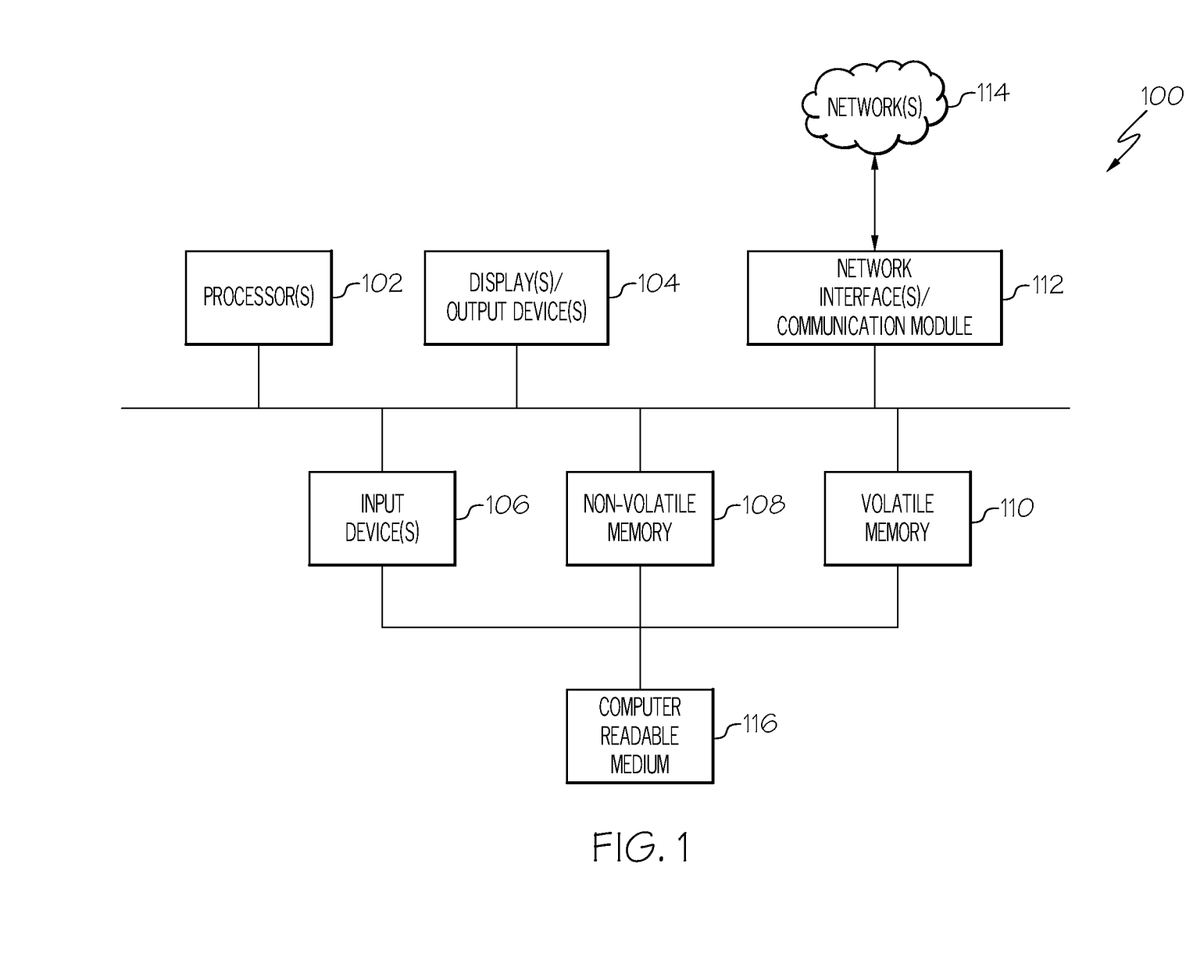
FIG. 1 is a block diagram illustrating computing hardware utilized in one or more devices for implementing various processes, media, and systems, according to one or more embodiments shown and described herein.

Turning to FIG. 1, a block diagram illustrates an example of a computing device 100, through which embodiments of the disclosure can be implemented, for example in a server, robot, or client device (tablet, smartphone, etc.). The computing device 100 described herein is but one example of a suitable computing device and does not suggest any limitation on the scope of any embodiments presented. Nothing illustrated or described with respect to the computing device 100 should be interpreted as being required or as creating any type of dependency with respect to any element or plurality of elements. In various embodiments, a computing device 100 may include, but need not be limited to, a desktop, laptop, server, client, tablet, smartphone, or any other type of device that can compress data. In an embodiment, the computing device 100 includes at least one processor 102 and memory (non-volatile memory 108 and/or volatile memory 110). The computing device 100 can include one or more displays and/or output devices 104 such as monitors, speakers, headphones, projectors, wearable-displays, holographic displays, and/or printers, for example. The computing device 100 may further include one or more input devices 106 which can include, by way of example, any type of mouse, keyboard, disk/media drive, memory stick/thumb-drive, memory card, pen, touch-input device, biometric scanner, voice/auditory input device, motion-detector, camera, scale, etc.

The computing device 100 may include non-volatile memory 108 (ROM, flash memory, etc.), volatile memory 110 (RAM, etc.), or a combination thereof. A network interface 112 can facilitate communications over a network 114 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM. Network interface 112 can be communicatively coupled to any device capable of transmitting and/or receiving data via the network 114. Accordingly, the hardware of the network interface 112 can include a communication transceiver for sending and/or receiving any wired or wireless communication. For example, the network interface hardware may include an antenna, a modem, LAN port, Wi-Fi card, WiMax card, mobile communications hardware, near-field communication hardware, satellite communication hardware and/or any wired or wireless hardware for communicating with other networks and/or devices.

A computer readable storage medium 116 may comprise a plurality of computer readable mediums, each of which may be either a computer readable storage medium or a computer readable signal medium. A computer readable storage medium 116 may reside, for example, within an input device 106, non-volatile memory 108, volatile memory 110, or any combination thereof. A computer readable storage medium can include tangible media that is able to store instructions associated with, or used by, a device or system. A computer readable storage medium includes, by way of non-limiting examples: RAM, ROM, cache, fiber optics, EPROM/Flash memory, CD/DVD/BD-ROM, hard disk drives, solid-state storage, optical or magnetic storage devices, diskettes, electrical connections having a wire, or any combination thereof. A computer readable storage medium may also include, for example, a system or device that is of a magnetic, optical, semiconductor, or electronic type. Computer readable storage media and computer readable signal media are mutually exclusive.

A computer readable signal medium can include any type of computer readable medium that is not a computer readable storage medium and may include, for example, propagated signals taking any number of forms such as optical, electromagnetic, or a combination thereof. A computer readable signal medium may include propagated data signals containing computer readable code, for example, within a carrier wave. Computer readable storage media and computer readable signal media are mutually exclusive.

The computing device 100 may include one or more network interfaces 112 to facilitate communication with one or more remote devices, which may include, for example, client and/or server devices. A network interface 112 may also be described as a communications module, as these terms may be used interchangeably.

Figure 2:
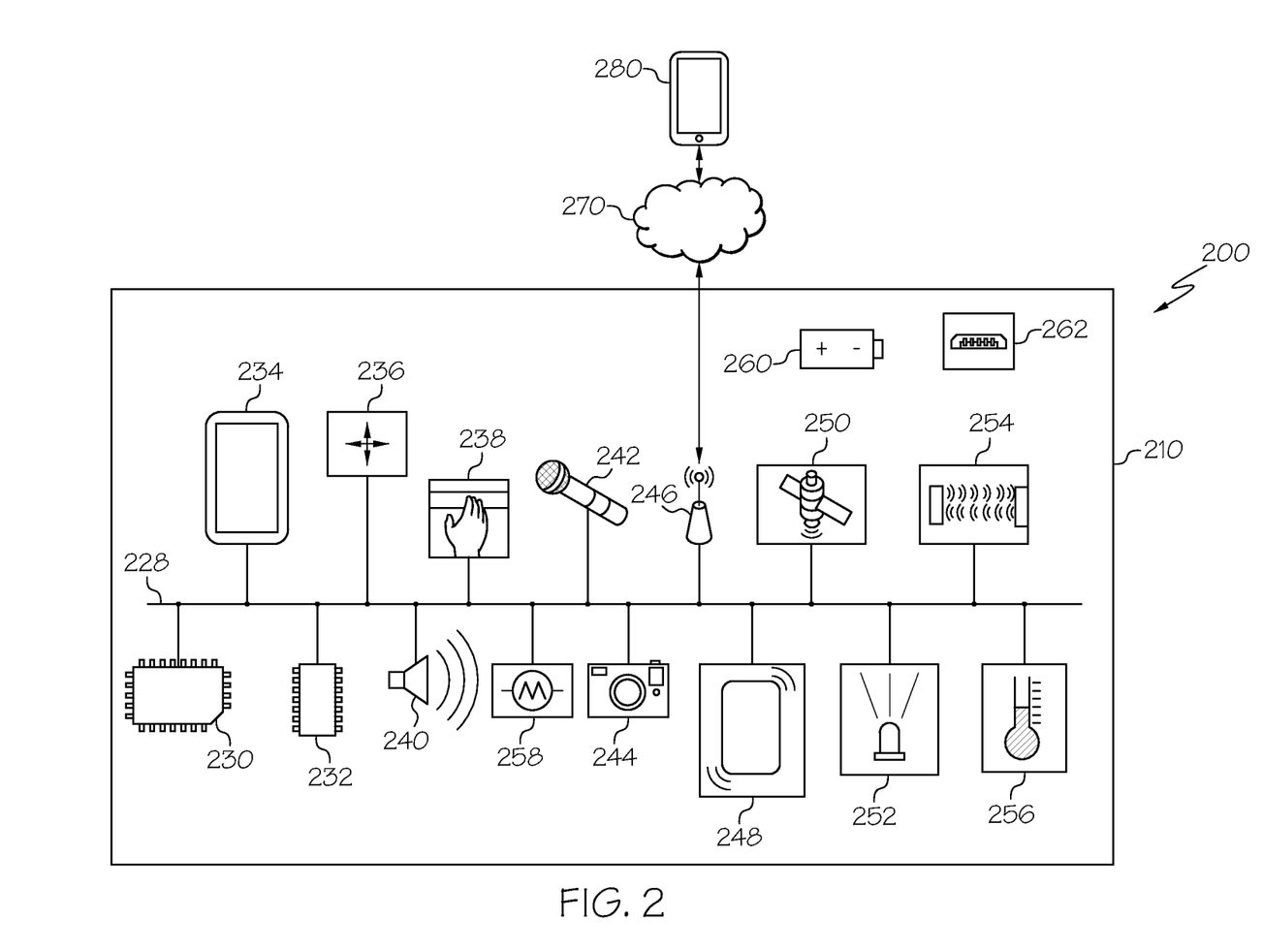
FIG. 2 is a block diagram illustrating hardware utilized in one or more robots for implementing various processes, media, and systems, according to one or more embodiments shown and described herein.

Turning to FIG. 2, example components of one embodiment of a robot 200 is schematically depicted. The robot 200 includes a housing 210, a communication path 228, a processor 230, a memory module 232, a display 234, an inertial measurement unit 236, an input device 238, a speaker 240, a microphone 242, a camera 244, network interface hardware 246, a tactile feedback device 248, a location sensor 250, a light 252, a proximity sensor 254, a temperature sensor 256, a motorized wheel assembly 258, a battery 260, and a charging port 262. The components of the robot 200 other than the housing 210 may be contained within or mounted to the housing 210. The various components of the robot 200 and the interaction thereof will be described in detail below.

Still referring to FIG. 2, the communication path 228 may be formed from any medium that is capable of transmitting a signal such as, for example, conductive wires, conductive traces, optical waveguides, or the like. Moreover, the communication path 228 may be formed from a combination of mediums capable of transmitting signals. In one embodiment, the communication path 228 comprises a combination of conductive traces, conductive wires, connectors, and buses that cooperate to permit the transmission of electrical data signals to components such as processors, memories, sensors, input devices, output devices, and communication devices. Accordingly, the communication path 228 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 228 communicatively couples the various components of the robot 200. As used herein, the term "communicatively coupled" means that coupled components are capable of exchanging data signals with one another such as, for example, electrical signals via conductive medium, electromagnetic signals via air, optical signals via optical waveguides, and the like.

The processor 230 of the robot 200 may be any device capable of executing machine-readable instructions. Accordingly, the processor 230 may be a controller, an integrated circuit, a microchip, a computer, or any other computing device. The processor 230 is communicatively coupled to the other components of the robot 200 by the communication path 228. Accordingly, the communication path 228 may communicatively couple any number of processors with one another, and allow the components coupled to the communication path 228 to operate in a distributed computing environment. Specifically, each of the components may operate as a node that may send and/or receive data. While the embodiment depicted in FIG. 2 includes a single processor 230, other embodiments may include more than one processor.

Still referring to FIG. 2, the memory module 232 of the robot 200 is coupled to the communication path 228 and communicatively coupled to the processor 230. The memory module 232 may comprise RAM, ROM, flash memories, hard drives, or any non-transitory memory device capable of storing machine-readable instructions such that the machine-readable instructions can be accessed and executed by the processor 230. The machine-readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine-readable instructions and stored in the memory module 232. Alternatively, the machine-readable instructions may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 2 includes a single memory module 232, other embodiments may include more than one memory module.

The display 234, if provided, is coupled to the communication path 228 and communicatively coupled to the processor 230. The display 234 may be any device capable of displaying information.

The inertial measurement unit 236, if provided, is coupled to the communication path 228 and communicatively coupled to the processor 230. The inertial measurement unit 236 may include one or more accelerometers and one or more gyroscopes. The inertial measurement unit 236 transforms sensed physical movement of the robot 200 into a signal indicative of an orientation, a rotation, a velocity, or an acceleration of the robot 200. The operation of the robot 200 may depend on an orientation of the robot 200 (e.g., whether the robot 200 is horizontal, tilted, and the like). Some embodiments of the robot 200 may not include the inertial measurement unit 236, such as embodiments that include an accelerometer but not a gyroscope, embodiments that include a gyroscope but not an accelerometer, or embodiments that include neither an accelerometer nor a gyroscope.

Still referring to FIG. 2, one or more input devices 238 are coupled to the communication path 228 and communicatively coupled to the processor 230. The input device 238 may be any device capable of transforming user contact into a data signal that can be transmitted over the communication path 228 such as, for example, a button, a switch, a knob, a microphone or the like. In some embodiments, the input device 238 includes a power button, a volume button, an activation button, a scroll button, or the like. The one or more input devices 238 may be provided so that the user may interact with the robot 200, such as to navigate menus, make selections, set preferences, and other functionality described herein. In some embodiments, the input device 238 includes a pressure sensor, a touch-sensitive region, a pressure strip, or the like. It should be understood that some embodiments may not include the input device 238. As described in more detail below, embodiments of the robot 200 may include multiple input devices disposed on any surface of the housing 210. In some embodiments, one or more of the input devices 238 are configured as a fingerprint sensor for unlocking the robot. For example, only a user with a registered fingerprint may unlock and use the robot 200.

The speaker 240 (i.e., an audio output device) is coupled to the communication path 228 and communicatively coupled to the processor 230. The speaker 240 transforms audio message data from the processor 230 of the robot 200 into mechanical vibrations producing sound. For example, the speaker 240 may provide to the user navigational menu information, setting information, status information, information regarding the environment as detected by image data from the one or more cameras 244, and the like. However, it should be understood that, in other embodiments, the robot 200 may not include the speaker 240.

The microphone 242 is coupled to the communication path 228 and communicatively coupled to the processor 230. The microphone 242 may be any device capable of transforming a mechanical vibration associated with sound into an electrical signal indicative of the sound. The microphone 242 may be used as an input device 238 to perform tasks, such as navigate menus, input settings and parameters, and any other tasks. It should be understood that some embodiments may not include the microphone 242.

Still referring to FIG. 2, the camera 244 is coupled to the communication path 228 and communicatively coupled to the processor 230. The camera 244 may be any device having an array of sensing devices (e.g., pixels) capable of detecting radiation in an ultraviolet wavelength band, a visible light wavelength band, or an infrared wavelength band. The camera 244 may have any resolution. The camera 244 may be an omni-directional camera, or a panoramic camera. In some embodiments, one or more optical components, such as a mirror, fish-eye lens, or any other type of lens may be optically coupled to the camera 244.

The network interface hardware 246 is coupled to the communication path 228 and communicatively coupled to the processor 230. The network interface hardware 246 may be any device capable of transmitting and/or receiving data via a network 270. Accordingly, network interface hardware 246 can include a wireless communication module configured as a communication transceiver for sending and/or receiving any wired or wireless communication. For example, the network interface hardware 246 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 246 includes hardware configured to operate in accordance with the Bluetooth wireless communication protocol. In another embodiment, network interface hardware 246 may include a Bluetooth send/receive module for sending and receiving Bluetooth communications to/from a portable electronic device 280. The network interface hardware 246 may also include a radio frequency identification ("RFID") reader configured to interrogate and read RFID tags.

In some embodiments, the robot 200 may be communicatively coupled to a portable electronic device 280 via the network 270. In some embodiments, the network 270 is a personal area network that utilizes Bluetooth technology to communicatively couple the robot 200 and the portable electronic device 280. In other embodiments, the network 270 may include one or more computer networks (e.g., a personal area network, a local area network, or a wide area network), cellular networks, satellite networks and/or a global positioning system and combinations thereof. Accordingly, the robot 200 can be communicatively coupled to the network 270 via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

Still referring to FIG. 2, as stated above, the network 270 may be utilized to communicatively couple the robot 200 with the portable electronic device 280. The portable electronic device 280 may include a mobile phone, a smartphone, a personal digital assistant, a camera, a dedicated mobile media player, a mobile personal computer, a laptop computer, and/or any other portable electronic device capable of being communicatively coupled with the robot 200. The portable electronic device 280 may include one or more processors, one or more memories and one or more displays. The one or more processors can execute logic to communicate with the robot 200. The portable electronic device 280 may be configured with wired and/or wireless communication functionality for communicating with the robot 200. In some embodiments, the portable electronic device 280 may perform one or more elements of the functionality described herein, such as in embodiments in which the functionality described herein is distributed between the robot 200 and the portable electronic device 280. In some embodiments, the portable electronic device 280 is the computing device 100 of FIG. 1.

The tactile feedback device 248 is coupled to the communication path 228 and communicatively coupled to the processor 230. The tactile feedback device 248 may be any device capable of providing tactile feedback to a user. The tactile feedback device 248 may include a vibration device (such as in embodiments in which tactile feedback is delivered through vibration), an air blowing device (such as in embodiments in which tactile feedback is delivered through a puff of air), or a pressure generating device (such as in embodiments in which the tactile feedback is delivered through generated pressure). It should be understood that some embodiments may not include the tactile feedback device 248.

The location sensor 250 is coupled to the communication path 228 and communicatively coupled to the processor 230. The location sensor 250 may be any device capable of generating an output indicative of a location. In some embodiments, the location sensor 250 includes a global positioning system (GPS) sensor, though embodiments are not limited thereto. Some embodiments may not include the location sensor 250, such as embodiments in which the robot 200 does not determine a location of the robot 200 or embodiments in which the location is determined in other ways (e.g., based on information received from the camera 244, the microphone 242, the network interface hardware 246, the proximity sensor 254, the inertial measurement unit 236 or the like). The location sensor 250 may also be configured as a wireless signal sensor capable of triangulating a location of the robot 200 and the user by way of wireless signals received from one or more wireless signal antennas.

The motorized wheel assembly 258 is coupled to the communication path 228 and communicatively coupled to the processor 230. The motorized wheel assembly 258 includes motorized wheels that are driven by one or motors. The processor 230 may provide one or more drive signals to the motorized wheel assembly 258 to actuate the motorized wheels such that the robot 200 travels to a desired location, such as a location that the user wishes to acquire environmental information (e.g., the location of particular objects within at or near the desired location).

Still referring to FIG. 2, the light 252 is coupled to the communication path 228 and communicatively coupled to the processor 230. The light 252 may be any device capable of outputting light, such as, but not limited to, a light emitting diode, an incandescent light, a fluorescent light, or the like. Some embodiments include a power indicator light that is illuminated when the robot 200 is powered on. Some embodiments include an activity indicator light that is illuminated when the robot 200 is active or processing data. Some embodiments include an illumination light for illuminating the environment in which the robot 200 is located. Some embodiments may not include the light 252.

The proximity sensor 254 is coupled to the communication path 228 and communicatively coupled to the processor 230. The proximity sensor 254 may be any device capable of outputting a proximity signal indicative of a proximity of the robot 200 to another object. In some embodiments, the proximity sensor 254 may include a laser scanner, a capacitive displacement sensor, a Doppler effect sensor, an eddy-current sensor, an ultrasonic sensor, a magnetic sensor, an optical sensor, a radar sensor, a lidar sensor, a sonar sensor, or the like. Some embodiments may not include the proximity sensor 254, such as embodiments in which the proximity of the robot 200 to an object is determine from inputs provided by other sensors (e.g., the camera 244, the speaker 240, etc.) or embodiments that do not determine a proximity of the robot 200 to an object 304A.

The temperature sensor 256 is coupled to the communication path 228 and communicatively coupled to the processor 230. The temperature sensor 256 may be any device capable of outputting a temperature signal indicative of a temperature sensed by the temperature sensor 256. In some embodiments, the temperature sensor 256 may include a thermocouple, a resistive temperature device, an infrared sensor, a bimetallic device, a change of state sensor, a thermometer, a silicon diode sensor, or the like. Some embodiments of the robot 200 may not include the temperature sensor 256.

Still referring to FIG. 2, the robot 200 is powered by the battery 260, which is electrically coupled to the various electrical components of the robot 200. The battery 260 may be any device capable of storing electric energy for later use by the robot 200. In some embodiments, the battery 260 is a rechargeable battery, such as a lithium-ion battery or a nickel-cadmium battery. In embodiments in which the battery 260 is a rechargeable battery, the robot 200 may include the charging port 262, which may be used to charge the battery 260. Some embodiments may not include the battery 260, such as embodiments in which the robot 200 is powered the electrical grid, by solar energy, or by energy harvested from the environment. Some embodiments may not include the charging port 262, such as embodiments in which the apparatus utilizes disposable batteries for power.

Figure 3:
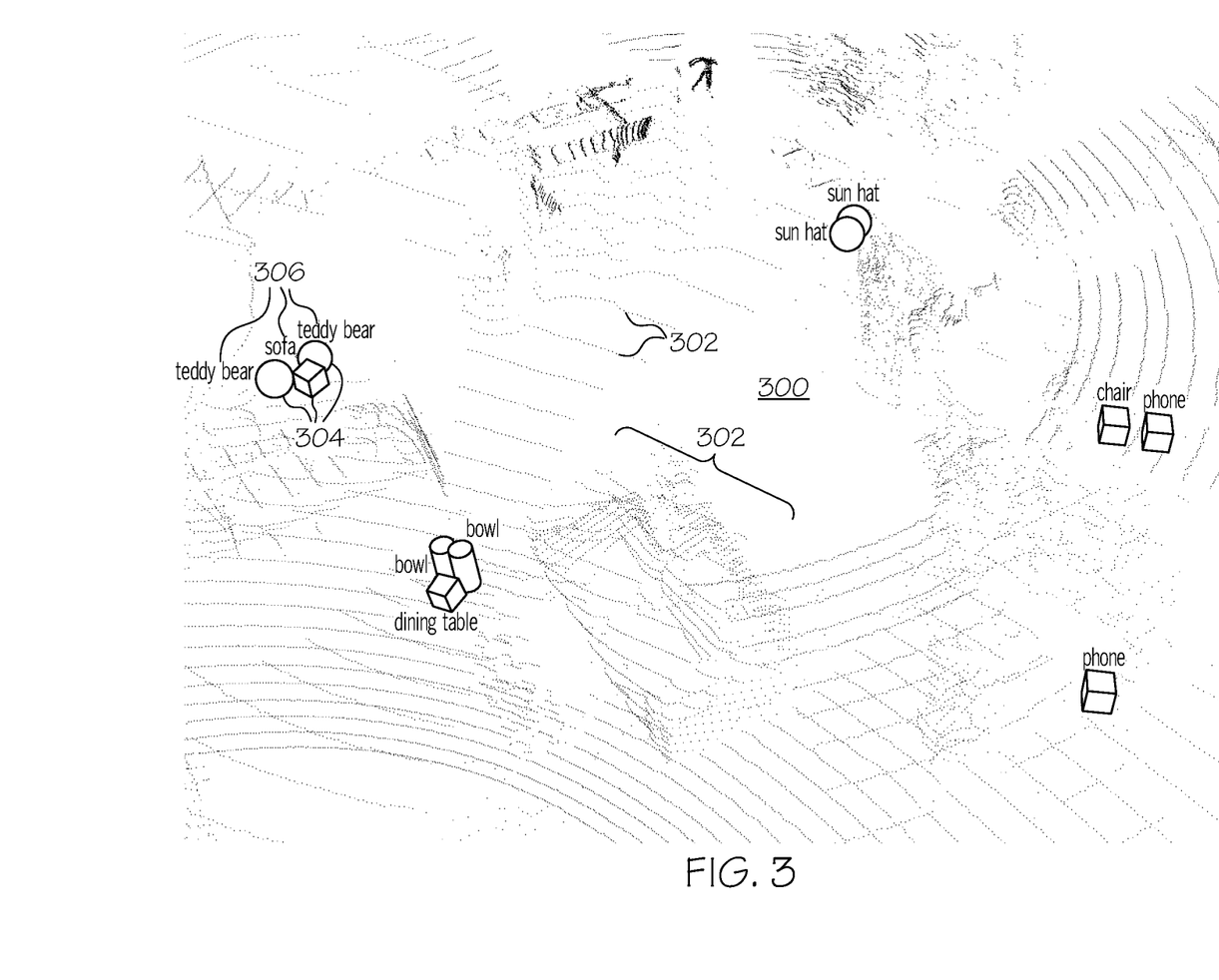
FIG. 3 illustrates a screen view of a point cloud environment according to one or more embodiments described and illustrated herein.

Turning to FIG. 3, a representation of an environment 300 is presented. The representation of FIG. 3 may be displayed on a display device of the computing device 100, on a display device of the portable electronic device 280, and/or on a display 234 of the robot 200. The representation of the environment may be generated based on sensor data obtained by the sensors of the robot 200 as described herein. As shown in FIG. 3, the displayed representation of the environment includes point clouds 302 presented along with objects 304 that are detected. Objects 304 (sofa, teddy bear, etc.) may be given labels 306 also shown on the displayed representation of the environment in order to give context to the object 304. In this embodiment the points are presented as light points on a dark background, and for clarity this color relationship has been inverted. Any suitable shading and/or color configuration may be utilized in other embodiments.

One or more robots 200 may operate and/or navigate in an environment 300. An environment 300 may be any space in which a robot 200 may function, such as indoors, outdoors, in the air, underwater, in outer space, etc. In this embodiment an environment 300 may be mapped using any suitable technology (visual cameras, 3D scanners, lidar, radar, infrared, etc.) to generate one or more point clouds 302. A point cloud 302 may be, for example, a set of data points in a three dimensional mapping at least partially corresponding to a real world space, such as may be obtained by spatial detection. Other embodiments may utilize a virtual 3D environment that does not correspond to a real world environment. When a real world object is detected and/or scanned in this embodiment, a point cloud 302 may be generated to denote the coordinates of the object 304. In some embodiments, at least some objects 304 may already be represented by point clouds 302 from previous scans or without ever having been scanned, such as where the position of the object 304 was already rendered with the environment 300. Any environment data, such as mapping and/or point cloud data, may be stored on one or more computing devices such as servers or clouds utilizing any suitable type of computer network 114. Stored environment data may include rendering data (such as 3D models, texture mapping, point clouds 302 of surroundings, skeleton view, pose, biometric recognition, object recognition) and/or labeling data. Any environment data may be shared with other devices.

A robot 200, as discussed in more detail above with respect to FIG. 2, may comprise sensors (light/rgb sensors, location sensors 250, proximity sensors 254, infrared sensors, lidar sensors, radar sensors, microwave sensors, sonar sensors, sound wave sensors, depth sensors, etc.) that may be used for mapping an environment 300 and/or objects 304, such as, for example, generating point cloud data of such environments 300 and/or objects 304, which may be used to generate the displays shown on the display devices as described herein. A robot 200 may comprise motors (electric, fuel-powered, mechanical, etc.), motor encoders (rotary encoders, shaft encoders, any electro-mechanical device that converts the angular position or motion of a shaft or axle to an analog or digital signal, etc.), obstacle/object/person avoidance systems, etc. A robot 200 may share environment mapping data with other devices, such as other robots also mapping the environment 300 (for example live or subsequently sharing/transmitting the data). Upon recognition of an object 304 within a robot's camera view, the robot 200 may report the object 304 to a database on the server. Robots 200 may have a navigation path in an environment 300 that is pre-planned, decided by the robot 200 as the robot 200 moves through the environment 300, or any other suitable navigation technique. In some embodiments a robot's navigation path may utilize mapping data about the environment 300 (such as for objects 304 within the environment 300) received from other robots that are presently or were previously in the environment 300. In some embodiments any suitable type of computation described with respect to a robot 200 may be performed on or with the assistance of another device, such as a server.

A client device (tablet, smartphone, laptop, desktop, headset or other wearable device, holographic display, etc.), for example the computing device 100 as discussed above in FIG. 1, the portable electronic device 280 discussed above with respect to FIG. 2 or the like, may be utilized to present an augmented reality display of the environment 300. An augmented reality display may, for example, overlay data (such as metadata) about objects 304 presently displayed on the client device. The client device may utilize any suitable type of sensor to perceive the environment 300, such as cameras, infrared, lidar, radar, microwave, sonar, sound wave, depth sensors, etc. In some embodiments an object 304 to be displayed on the client device may be determined based upon a line projected from the client device into the environment 300. In some embodiments the client device may track its own orientation/pose, whereas in other embodiments the orientation/pose may be tracked by any suitable means such as visually by 3 or 4 cameras to track the position of light emitting diodes (LEDs) on the client device, or tracking the position of infrared LEDs on the client device using 3 or 4 infrared cameras (although any suitable number of such cameras may be utilized for any examples herein).

The client device may present an augmented reality view of an environment 300 utilizing its own view with supplemental data provided by one or more robots 200 presently or previously in the environment 300. In some embodiments this may include labels 306 for objects 304, whereby selecting a label 306 on the client device may reveal additional information about the object 304, such as a name, dimensions, etc. In some embodiments selecting a label 306 on the display of a client device may cause a robot 200 to interact with the object 304 corresponding to the label 306, which may include, for example, picking up the object 304, moving the object 304, changing the orientation of the object 304, rescanning the object 304, etc. In some embodiments the client device may be configured to provide commands that may be given to the robot 200 on how to interact with the object 304, such as having the robot 200 pick up the object 304 and bring it to the user of the client device. The user may also be able to interact directly with a robot, such as by pointing the client device at the robot 200. For example, by pointing the client device at a part of the robot 200, such as an arm, the client device may allow configuration changes to be made, such as adjusting a speed parameter that controls how fast the robot arm moves.

The client device may display the robot's path through the environment 300, such as with a glowing line or arrow on the floor. In some embodiments, this displayed path may update in real time based upon changing conditions in the environment 300 and/or updated path instructions given to the robot 200. Raw sensor data (speed, temperature, gradient, etc.) may also be displayed on the client device when the robot 200 is in view or selected on the client device. Some object data received by the client device may be received from a server (or the cloud, etc.), from one or more robots 200, or any combination thereof. Some embodiments may provide for the client device to indicate what a robot 200 is intending to do, such as move an object 304 by showing a projected path for the object 304. In some embodiments the client device may be provide for labelling 306 of objects 304 in the environment 300 about which the robot 200 does not yet have data.

Figure 4:
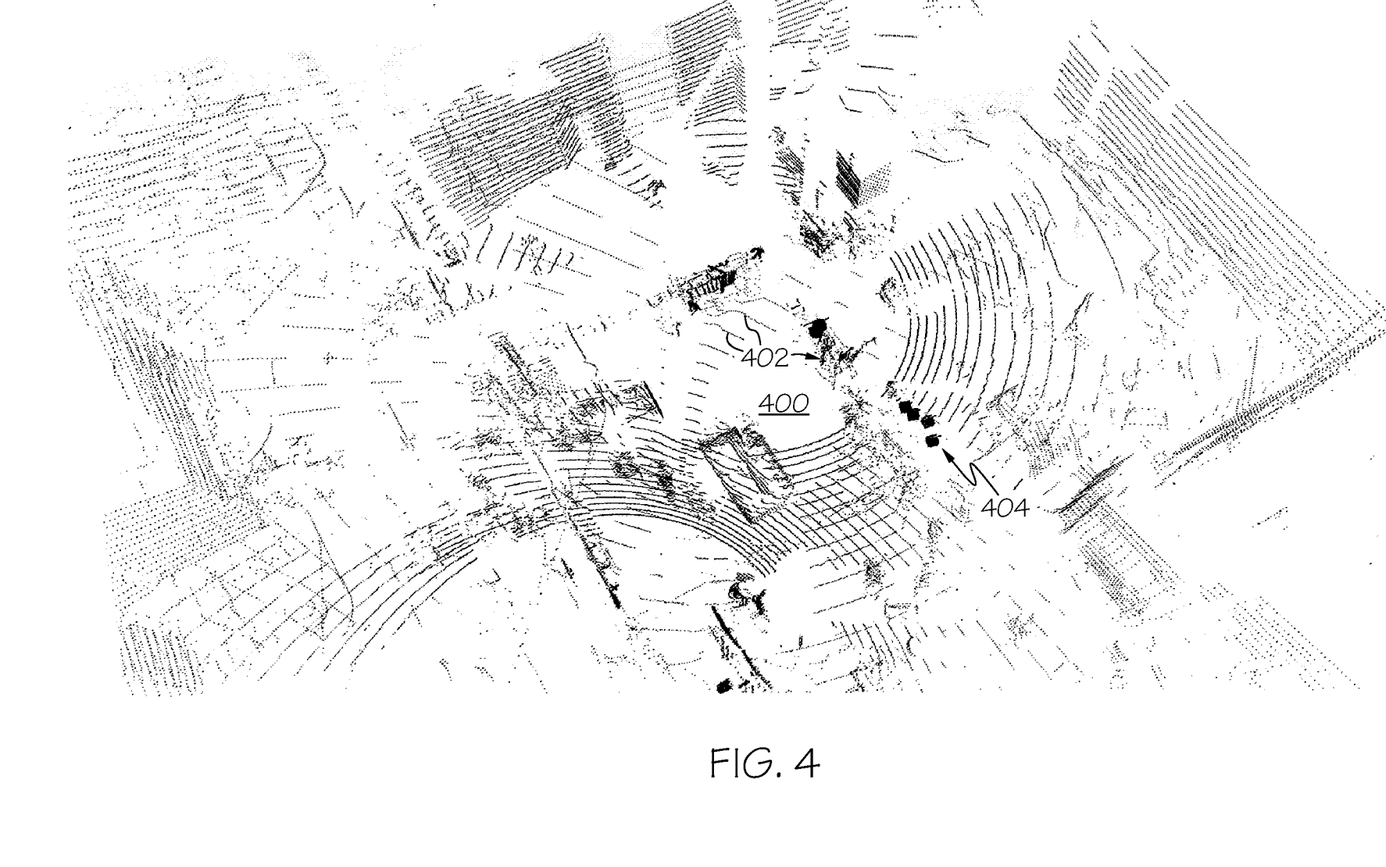
FIG. 4 illustrates a screen view of a point cloud environment according to one or more embodiments described and illustrated herein.

Turning to FIG. 4, a representation of an environment 400 is presented. The representation of FIG. 4 may be displayed on a display device of the computing device 100, on a display device of the portable electronic device 280, and/or on a display 234 of the robot 200. The representation of the environment may be generated based on sensor data obtained by the sensors of the robot 200 as described herein. In this embodiment, point clouds 402 may be utilized to represent what a robot 200 detects, such as with lidar detection. Objects 404 detected in the environment may be represented by shapes as shown here, although any suitable indicator (or none at all) may be utilized. Any suitable shading and/or color configuration may be utilized in other embodiments.

Figure 5:
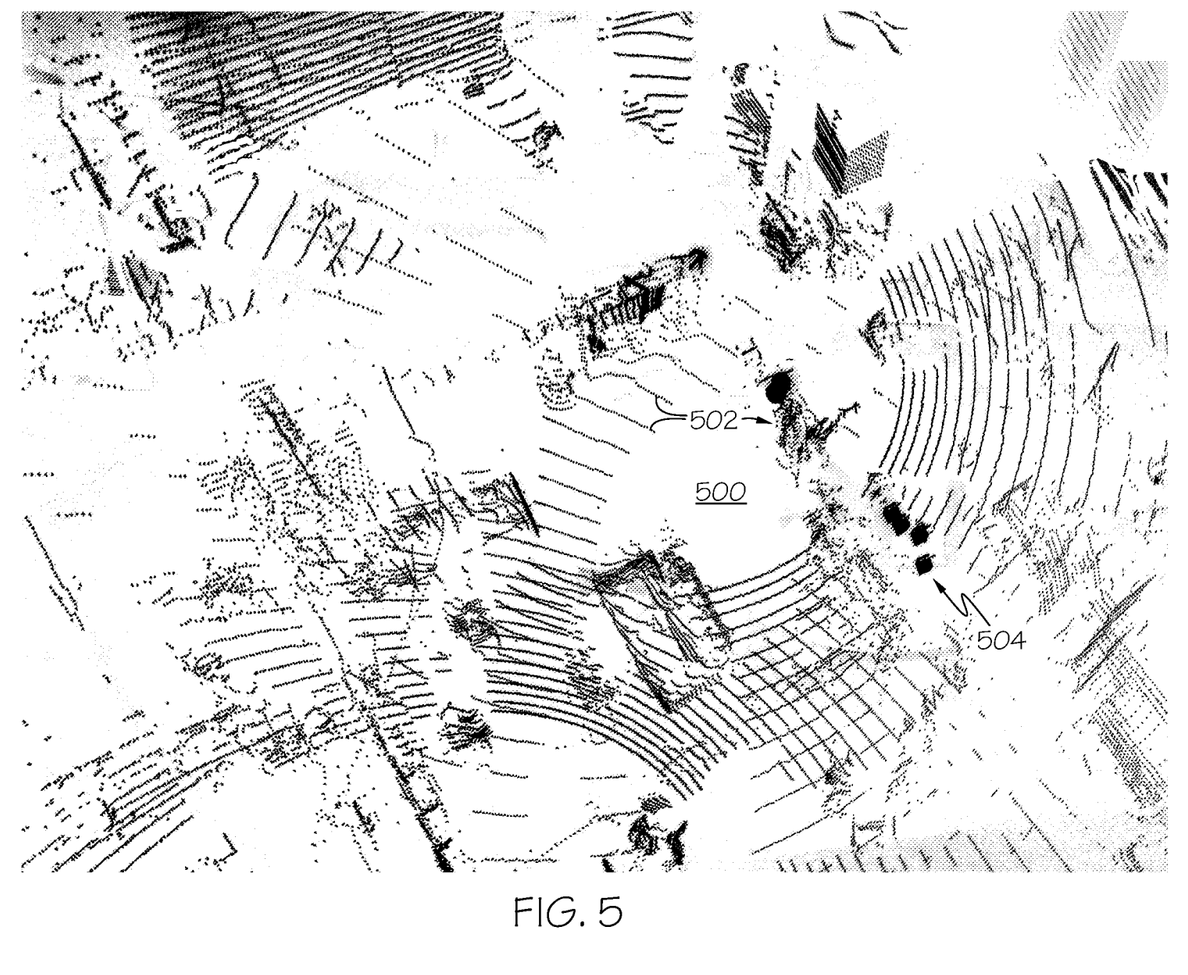
FIG. 5 illustrates a screen view of a point cloud environment according to one or more embodiments described and illustrated herein.

Turning to FIG. 5, a representation of an environment 500 is presented. The representation of FIG. 5 may be displayed on a display device of the computing device 100, on a display device of the portable electronic device 280, and/or on a display 234 of the robot 200. The representation of the environment may be generated based on sensor data obtained by the sensors of the robot 200 as described herein. In this embodiment, point clouds 502 may be utilized to represent what a robot detects, such as with lidar detection. Objects 504 detected in the environment may be represented by shapes as shown here, although any suitable indicator (or none at all) may be utilized. Any suitable shading and/or color configuration may be utilized in other embodiments.

Figure 6:
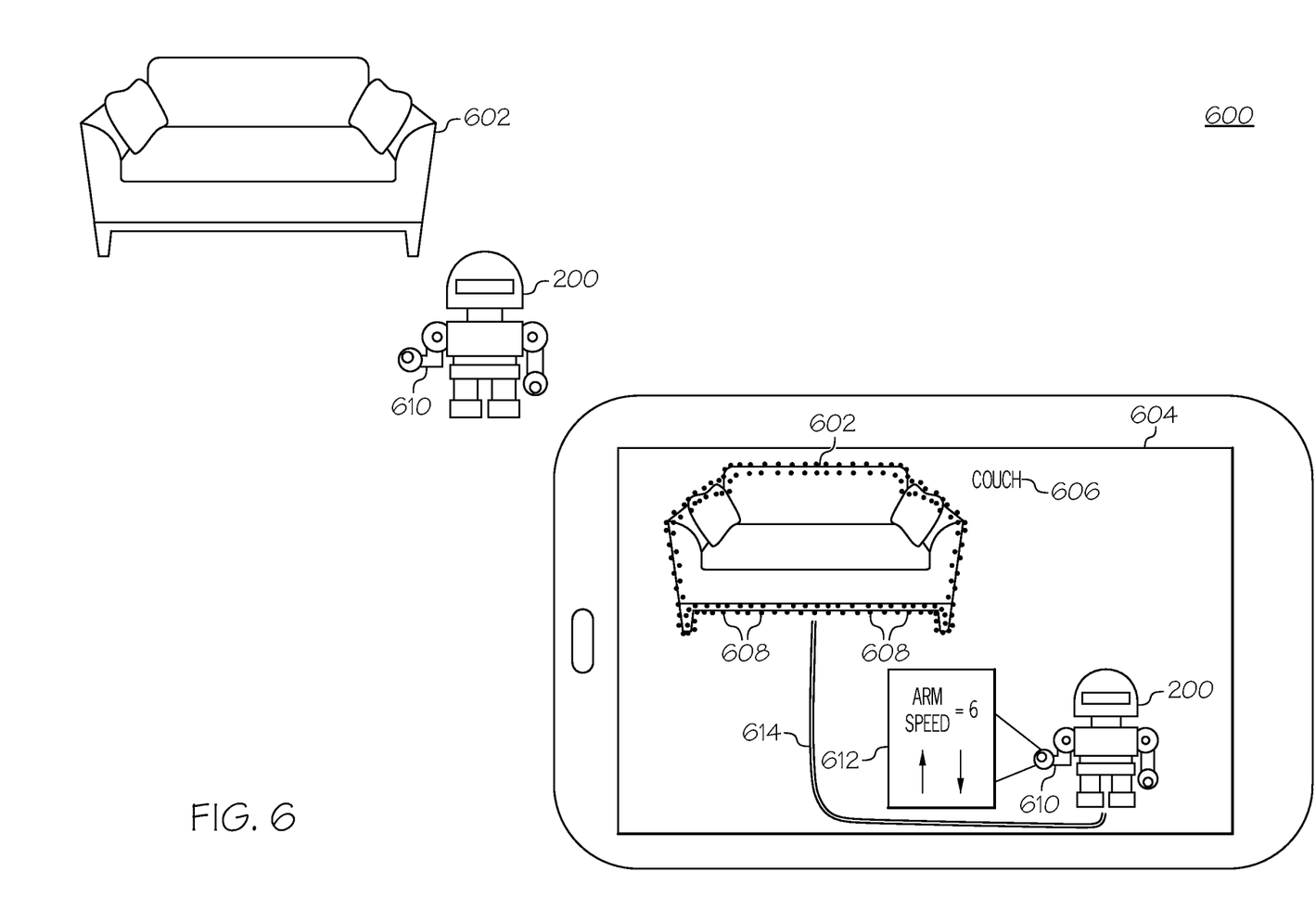
FIG. 6 illustrates a client device view of an augmented reality environment according to one or more embodiments described and illustrated herein.

Turning to FIG. 6, a client device view of an augmented reality environment 600 is presented. In this embodiment an object 602 is depicted as a couch, although any type of object 602 and quantity of objects 602 may be utilized. A robot 200 is also shown in this embodiment, although other embodiments may only feature only robots 200, only objects 602, or neither. In this embodiment, a client device 604 is depicted as observing the augmented reality environment 600 with an optical sensor such as a camera (not shown), although any suitable type of imaging sensor may be utilized (infrared, lidar, radar, microwave, sonar, sound wave, depth sensor, etc.). One or more client devices 604 may be utilized, where each client device 604 may be any suitable type of device capable of processing and/or transmitting data. In this embodiment, the client device 604 features a display, where any suitable type and/or quantity of displays (including no displays) may be utilized on the client device 604. On the display, the object 602 is shown, along with a label 606 associated with the object 602 reading 'COUCH'. In this embodiment, the label 606 may be obtained directly from a robot 200 or another device, and may be based upon object recognition performed on image data obtained from the robot 200 or any other suitable source. The object recognition may utilize any suitable type technique/algorithm, and may be performed locally at the robot 200 or provided to another device (such as a server) that may perform the object recognition. In other embodiments the robot 200 may perform initial object recognition upon an object 602, with further processing (such as more detailed object recognition) being performed on another device (such as a server). An object 602 may be given a label 606 by a user or may be assigned a label 606 by any suitable technique, such as matching similar objects as determined within a database and/or by one or more neural networks.

In this embodiment of the augmented reality environment 600, point cloud indicators 608 are also depicted, here in the form of point cloud dots, although any suitable type/quantity of point cloud indicators 608 may be utilized. The point cloud data may be obtained directly from a robot 200 or another device (such as a server). Based upon a three dimensional point cloud model, point cloud data may be imposed on the image shown on the client device 604. A virtual representation of the environment may comprise a point cloud overlay upon a camera representation of the environment of the robot. In this embodiment, point cloud indicators 608 are imposed on the image of the object 602 shown on the client device 604, such as on a specific object 602 (as shown here), on various objects, on robots 200, or throughout the augmented reality environment 600. In various embodiments the augmented reality view may be updated based upon moving the viewpoint of the client device 604 and/or based upon updated data and/or conditions in the environment. The augmented reality environment 600 may be updated due to, for example, receiving updated data from robots 200 and/or from other devices (such as servers) pertaining to the objects 602 in the augmented reality environment 600, which may result in updated labels 606 and/or updated point cloud data, such as updated point cloud indicators 608.

In this embodiment, a portion 610 of the robot 200 (here an arm) is in view of the client device 604 and has been selected by a user, bringing up a configuration interface 612 for the portion 610. In this embodiment the configuration interface 612 provides the current speed at which the portion 610 is configured to move, with options to modify the speed up or down. Any portion of the robot 200 may have a configuration menu, which in some embodiments may have permissions such that only certain users and/or devices to access certain configuration menus. Any type of configuration interface or interface providing status information may be triggered for any type of robot 200, portion 610, and/or object 602. In other embodiments configuration menus may also be accessed when a robot 200 or object 602 is not in view of the client device 604, or when a robot 200 or object 602 moves out of view of the client device 604.

A path 614 is also depicted in this embodiment, where a user has selected the object 602 on the client device 604. As used herein, any suitable form of selection (keyboard, mouse, eye movement, gesture, etc.) may be utilized as input. In this embodiment, by selecting the object 602, the user directs the robot 200 to interact with the object 602. As shown here, the robot's intention to interact with the object 602 is depicted as a path 614. In some embodiments the path 614 may be updated based upon inputs from the same user, other users, and/or other devices. The path 614 may also be updated based upon changing conditions and/or updated detection of objects 602. For example, an obstacle may suddenly move into the path 614, which could require a change in the path 614 of the robot 200. In another example, the robot 200 (or another robot) may not have previously detected the obstacle, but the robot 200 now detects the obstacle, which may require a change in the path 614. In some embodiments the path 614 may be changed at another device (such as a server or the client device) automatically or based upon input from a user to change the path and/or destination (such as to the object 602 with which interaction is sought).

Figure 7:
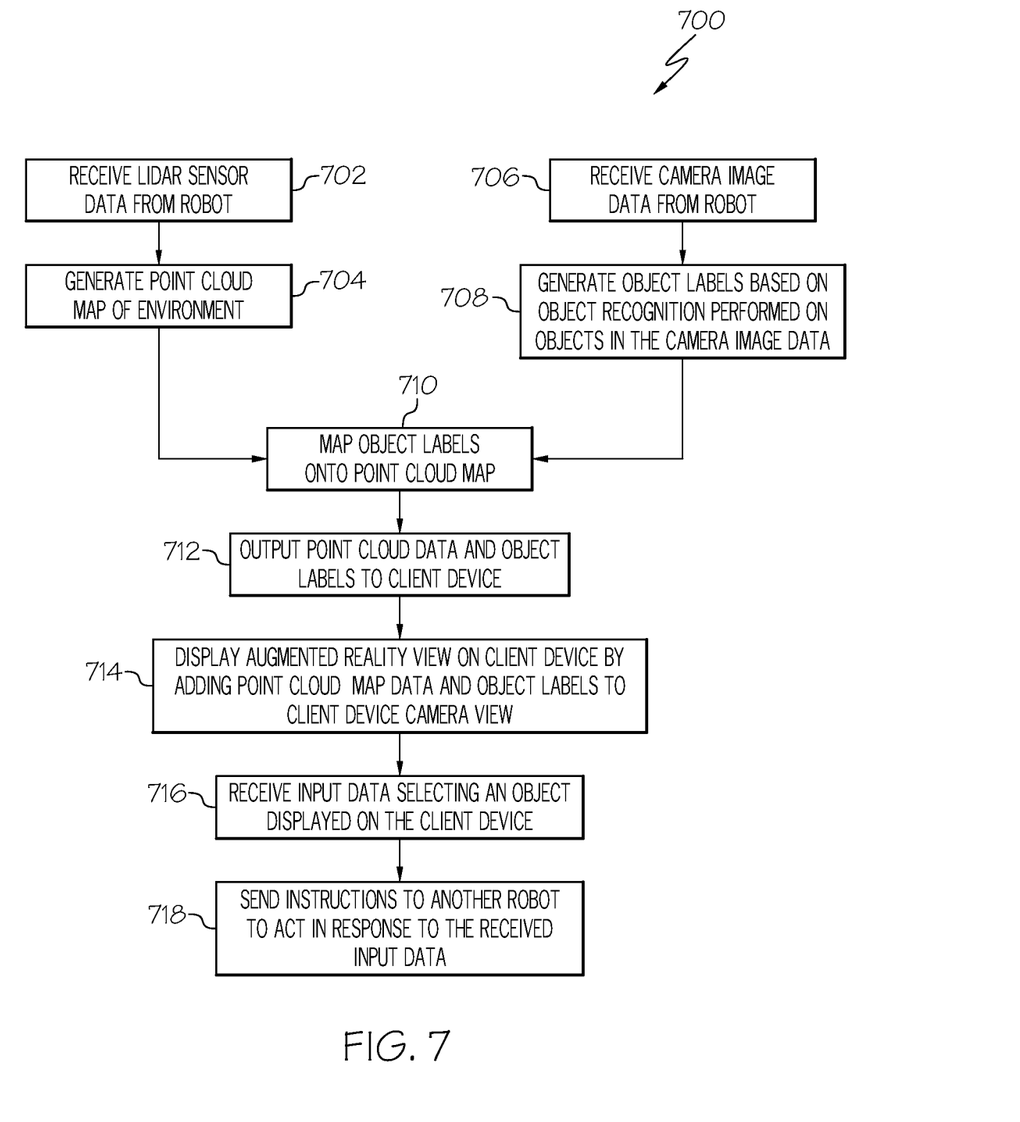
FIG. 7 illustrates a flow chart for an augmented reality view on a client device according to one or more embodiments described and illustrated herein

Turning to FIG. 7, a flowchart 700 for an augmented reality view on a client device is presented. At block 702, a device (such as a server) receives lidar sensor data from a robot. At block 704, the device generates a point cloud mapping of the environment of the robot based upon current and/or prior lidar sensor data provided by the robot (or any other robot or device, or any combination thereof). At block 706, the device also receives camera image data from the robot, although this may be received by another robot or device, and need not be received at the same time as the lidar sensor data at block 702. At block 708, the received camera image data from the robot is subjected to image processing for object recognition at the device. Based upon the object recognition, an object label may be assigned to any detected objects in the image data. As discussed above, any suitable type of object recognition may be utilized. At block 710, the object label(s) obtained at block 708 are applied to objects within the point cloud map obtained at block 704. At block 712, point cloud data and object labels are output to a client device. In this embodiment the client device may apply point cloud data and/or object labels received from the device to the client device's current view data. In other embodiments the client device sends its current view data to the device such that the device can apply the point cloud data and/or object labels to the client device's current view data, which may then be sent back to the client device for display. At block 714, the client device may display an augmented reality view with point cloud data and object labels imposed on the client device's view. At block 716, input data may be received that selects an object displayed on the client device. At block 718, instructions may be sent to another robot to act in response to the received input data. Instructions may include, for example, directives for this other robot to pick up and/or retrieve the selected object at block 716. In other embodiments, instructions may be sent to the same robot at block 702 and/or block 706.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A computing device configured to display a virtual representation of an environment of a robot on a display device, the computing device comprising:
    a memory; and
    a processor coupled to the memory, wherein the processor is configured to:
        receive data from a visual detection sensor and a spatial detection sensor of an other robot that was previously in the environment of the robot with respect to an object within the environment;
        generate point cloud data to denote coordinates of the object based on the data received from the other robot that was previously in the environment of the robot;
        generate, for display on the display device, a virtual representation of the object by visually imposing the data received from the spatial detection sensor upon the data received from the visual detection sensor, wherein the virtual representation of the object for display comprises a plurality of point cloud indicators generated based on the point cloud data;
        receive input data selecting the virtual representation of the object;
        output instructions for the robot to interact with the object within the environment of the robot based upon the input data selecting the virtual representation of the object; and
        display a navigation path of the robot generated based on mapping data of the environment received from the other robot.

2. The computing device of claim 1, wherein the processor is further configured to:
    receive data from a user to specify or update a label of the object;
    associate the specified or updated label with the object; and
    output on the display device the object and the specified or updated label.

3. The computing device of claim 1, wherein the processor is further configured to output to a different robot the data corresponding to the virtual representation of the object.

4. The computing device of claim 3, wherein the processor is further configured to:
    receive output from the different robot comprising an updated virtual representation of the object; and
    output the updated virtual representation to the other robot.

5. The computing device of claim 1, wherein the processor is further configured to:
    assign a label to the object; and
    display the label assigned to the object within the virtual representation of the environment of a robot.

6. The computing device of claim 1, wherein the virtual representation of the environment comprises the point cloud overlaid upon a camera representation of the environment of the robot.

7. The computing device of claim 6, further comprising an additional sensor utilized for at least one of object recognition, object labeling, pose estimation, a depth view, and a skeleton view.

8. The computing device of claim 1, wherein the processor is further configured to:
    receive the mapping data from the other robot;
    determine an action that the robot will perform; and
    output, within the virtual representation of the environment of the robot, an indication of the action that the robot will perform.

9. The computing device of claim 1, wherein the navigation path is updated in response to detection of an obstacle detected by the robot.

10. The computing device of claim 1, wherein the processor is further configured to:
    receive data from a visual detection sensor and a spatial detection sensor of the robot that is presently in the environment with respect to the object with in the environment; and
    update the virtual representation of the object based on the data received from the robot presently in the environment.

11. A system for object interaction in an environment of a robot, comprising:
the robot comprising a plurality of sensors, wherein:
a first sensor is configured for visual detection; and
a second sensor is configured for spatial detection;
a display device configured to display a virtual representation of the object within a virtual mapping of the environment based on the data received from at least one of the plurality of sensors; and
a computing device configured to:
receive data from the plurality of sensors of an other robot that was previously in the environment of the robot with respect to an object within the environment;
generate point cloud data to denote coordinates of the object based on the data received from the other robot that was previously in the environment of the robot;
generate, for display on the display device, the virtual representation of the object by visually imposing spatial data received from the second sensor upon visual data received from the first sensor, wherein the virtual representation of the object for display comprises a plurality of point cloud indicators generated based on the point cloud data;
receive input data selecting the virtual representation of the object;
output instructions for the robot to interact with the object within the environment of the robot based upon the input data selecting the virtual representation of the object; and
display a navigation path of the robot generated based on mapping data of the environment received from the other robot.

12. The system of claim 11, wherein:
the robot is further configured to obtain data from the second sensor as a second point cloud; and
the display device is configured to output the second point cloud representation of the environment of the robot.

13. The system of claim 12, wherein the display device is further configured to generate an augmented reality view on the display device by utilizing the second point cloud representation to overlay second point cloud data and a label for an object displayed on the display device.

14. The system of claim 11, wherein the display device is further configured to receive:
data from the robot pertaining to an object in the environment of the robot; and
data from the computing device pertaining to a different object in the environment of the robot.

15. The system of claim 11, wherein the robot further comprises an on-board mapping system utilizing at least one of the plurality of sensors for obstacle avoidance.

16. The system of claim 11, wherein:
the robot further comprises an on-board navigation system and a motor encoder;
the first sensor comprises a camera configured to provide image data for object recognition of the object; and
the second sensor comprises a lidar sensor configured to generate second point cloud data of the environment of the robot.

17. The system of claim 16, wherein:
the computing device is configured to output the second point cloud data of the environment of the robot to the display device;
the display device comprises a camera; and
the display device is configured to receive the second point cloud data to overlay over a camera view provided by a camera.

18. A method for object interaction in an environment of a robot, comprising:
receiving data from one of a visual detection sensor and a spatial detection sensor of an other robot that was previously in the environment of the robot with respect to an object within the environment;
generating point cloud data to denote coordinates of the object based on the data received from the other robot that was previously in the environment of the robot;
generating, for display on a display device, a virtual representation of the object by visually imposing the data received from the spatial detection sensor upon the data received from the visual detection sensor, wherein the virtual representation of the object for display comprises a plurality of point cloud indicators generated based on the point cloud data;
receiving input data selecting the virtual representation of the object;
outputting instructions for the robot to interact with the object within the environment of the robot based upon the input data selecting the virtual representation of the object; and
displaying a navigation path of the robot generated based on mapping data of the environment received from the other robot.

19. The method of claim 18 further comprising:
receiving image data pertaining to a component of the robot;
outputting configuration data pertaining to the component of the robot;
receiving input data to modify the configuration data; and
outputting the input data to modify how an operation is performed by the component of the robot.

20. The method of claim 18 further comprising:
receiving image data from a camera, wherein the image data comprises a representation of a client device;
determining a pose of the client device based upon a plurality of emitters on the client device; and
projecting a line in a virtual mapping of the environment extending from the client device in a direction of the pose of the client device.

21. The method of claim 20 further comprising instructing the robot to bring the object to the client device.

* * * * *

UNITED STATES PATENT AND TRADEMARK OFFICE
CERTIFICATE OF CORRECTION

| | | |
|---|---|---|
| PATENT NO. | : 11,989,835 B2 | Page 1 of 1 |
| APPLICATION NO. | : 16/038248 | |
| DATED | : May 21, 2024 | |
| INVENTOR(S) | : Matthew Amacker, Arshan Poursohi and Allison Thackston | |

It is certified that error appears in the above-identified patent and that said Letters Patent is hereby corrected as shown below:

On the Title Page

Item (52), U.S. Cl., CPC, delete "G05D 1/0038 (2013.01)" and insert --G05D 1/0038 (2024.01)--, therefor.

In the Specification

In Column 2, Line(s) 40, after "herein", insert --.--.

In Column 4, Line(s) 2, delete "communications" and insert --communication--, therefor.

In the Claims

In Column 15, Line(s) 8, Claim 11, before "data", delete "the".

Signed and Sealed this
Twenty-fifth Day of March, 2025

Coke Morgan Stewart
*Acting Director of the United States Patent and Trademark Office*